(12) United States Patent
Ly et al.

(10) Patent No.: US 11,601,981 B2
(45) Date of Patent: Mar. 7, 2023

(54) TWO-STEP RACH PROCEDURE FOR NR REDUCED CAPABILITY UE

(71) Applicant: QUALCOMM Incorporated, San Diego, CA (US)

(72) Inventors: Hung Dinh Ly, San Diego, CA (US); Wanshi Chen, San Diego, CA (US); Jing Lei, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 137 days.

(21) Appl. No.: 16/913,982

(22) Filed: Jun. 26, 2020

(65) Prior Publication Data
US 2021/0037573 A1 Feb. 4, 2021

Related U.S. Application Data

(60) Provisional application No. 62/881,278, filed on Jul. 31, 2019.

(51) Int. Cl.
*H04W 72/04* (2009.01)
*H04W 74/08* (2009.01)

(52) U.S. Cl.
CPC ..... *H04W 74/0833* (2013.01); *H04W 72/042* (2013.01)

(58) Field of Classification Search
CPC ... H04W 52/54; H04W 48/08; H04W 74/008; H04W 74/0841; H04W 74/006; H04W 74/002; H04W 40/00
See application file for complete search history.

(56) References Cited

U.S. PATENT DOCUMENTS

| 2009/0196242 A1* | 8/2009 | Sambhwani | H04W 74/002 |
| | | | 370/329 |
| 2012/0002617 A1* | 1/2012 | Vujcic | H04W 74/002 |
| | | | 370/329 |

(Continued)

FOREIGN PATENT DOCUMENTS

| EP | 3413607 A1 | 12/2018 |
| WO | 2016168024 A1 | 10/2016 |

OTHER PUBLICATIONS

Nokia et al: 2-step RACH Procedure Feature lead summary; 3GPP DRAFT; R1-1905764 2-Step RACH Procedure Feature Lead Summary RAN1#96B, 3rd Generation Partnership Project (3GPP), Mobile Competence Centre; 650, Route Des Lucioles; F-06921 Sophia-Antipolis Ced; vol. RAN WG1, No. Xi?an, China ;Apr. 8, 2019-Apr. 12, 2019, Apr. 15, 2019 (Apr. 15, 2019), XP051707820, Retrieved from the Internet: URL:http://www.3gpp.org/ftp/tsg%5Fran/WG1%5FRL1/TSGR1%5F96b/Docs/R1%2D1905764%2Ezip [retrieved on Apr. 15, 2019].

(Continued)

*Primary Examiner* — Chi Ho A Lee
(74) *Attorney, Agent, or Firm* — Qualcomm Incorporated

(57) ABSTRACT

A random access configuration information having a plurality of random access configurations that may be utilized by UE to provide coverage enhancements for a two-step RACH process. The apparatus receives, from a base station, random access configuration information. The random access configuration information comprising a plurality of random access configurations. The apparatus selects one of the plurality of random access configurations. The apparatus generates a first random access message having a preamble and a payload, based on the selected random access configuration. The apparatus transmits the first random access (Continued)

message to the base station to initiate a random access procedure.

30 Claims, 11 Drawing Sheets

(56) References Cited

U.S. PATENT DOCUMENTS

| | | | | |
|---|---|---|---|---|
| 2013/0343307 | A1* | 12/2013 | Desai | H04W 74/04 |
| | | | | 370/329 |
| 2014/0161070 | A1* | 6/2014 | Chang | H04W 74/0833 |
| | | | | 370/329 |
| 2018/0098298 | A1* | 4/2018 | Jung | H04W 48/08 |
| 2018/0124705 | A1* | 5/2018 | Su | H04W 52/0261 |
| 2019/0363843 | A1* | 11/2019 | Gordaychik | H04W 52/54 |
| 2020/0205202 | A1* | 6/2020 | Takahashi | H04W 16/28 |
| 2021/0120581 | A1* | 4/2021 | Kim | H04W 74/008 |
| 2021/0352575 | A1* | 11/2021 | Chun | H04W 72/02 |
| 2021/0378027 | A1* | 12/2021 | Wang | H04W 74/0841 |
| 2022/0022263 | A1* | 1/2022 | Zhang | H04W 74/006 |
| 2022/0132436 | A1* | 4/2022 | Hoshino | H04L 1/08 |
| 2022/0191945 | A1* | 6/2022 | Yamamoto | H04W 74/008 |

OTHER PUBLICATIONS

International Search Report and Written Opinion dated Oct. 2, 2020 from corresponding PCT Application No. PCT/US2020/040018.

* cited by examiner

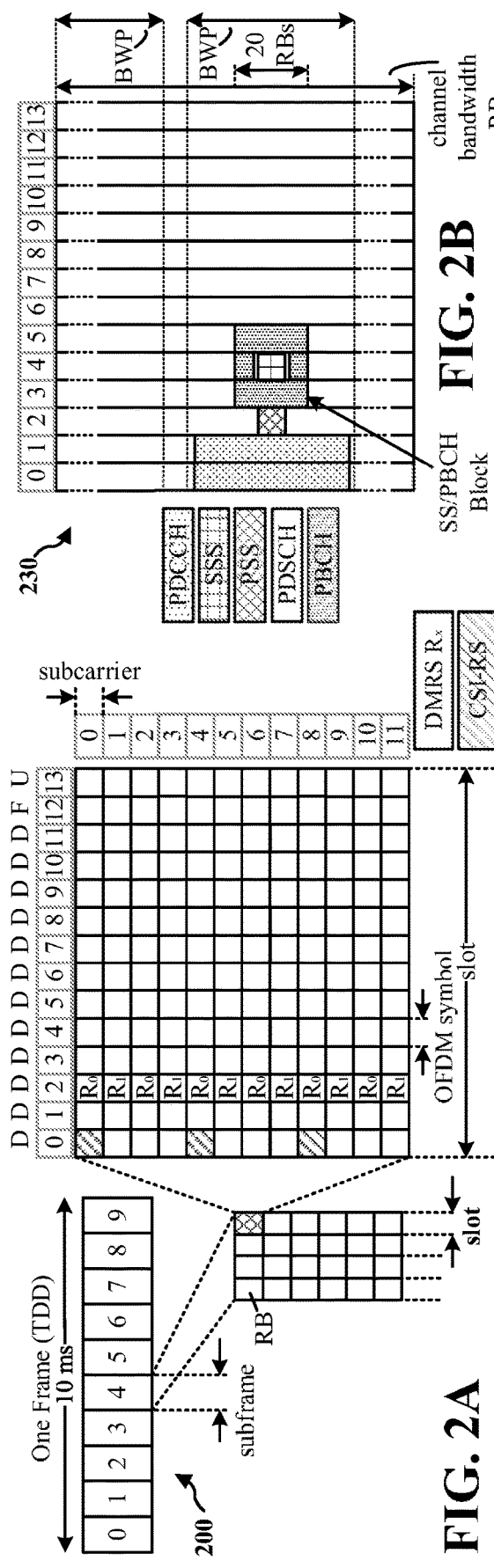
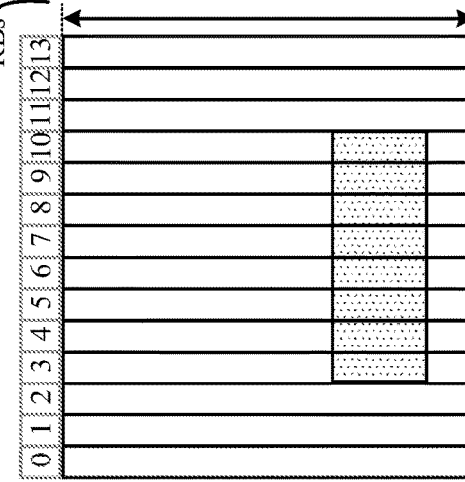
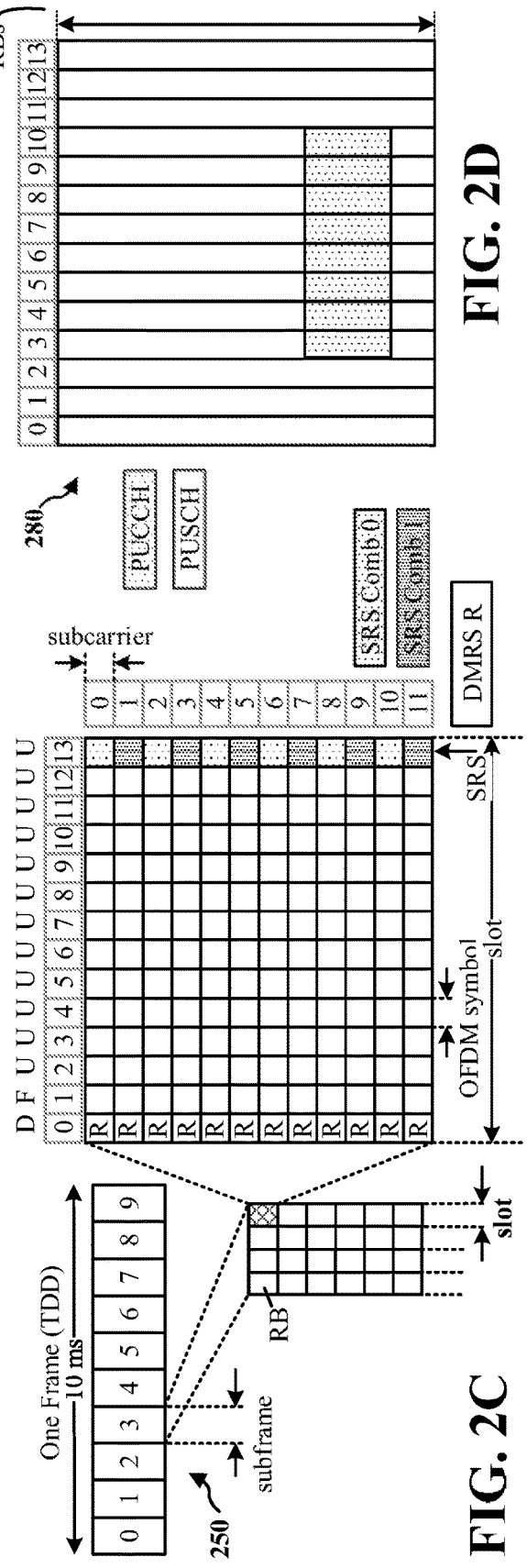

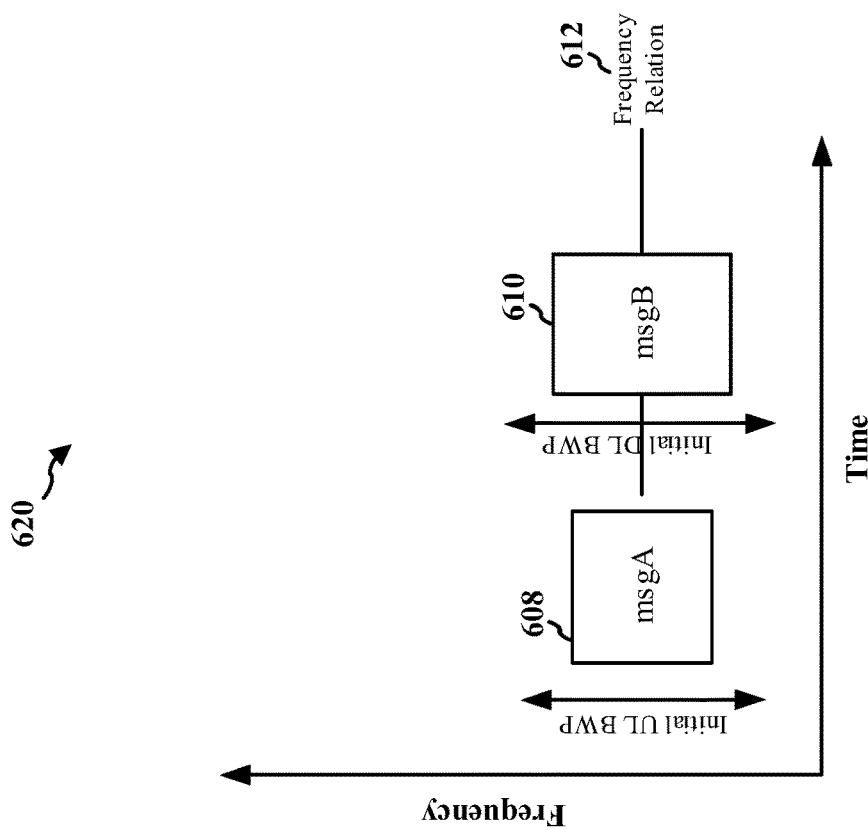
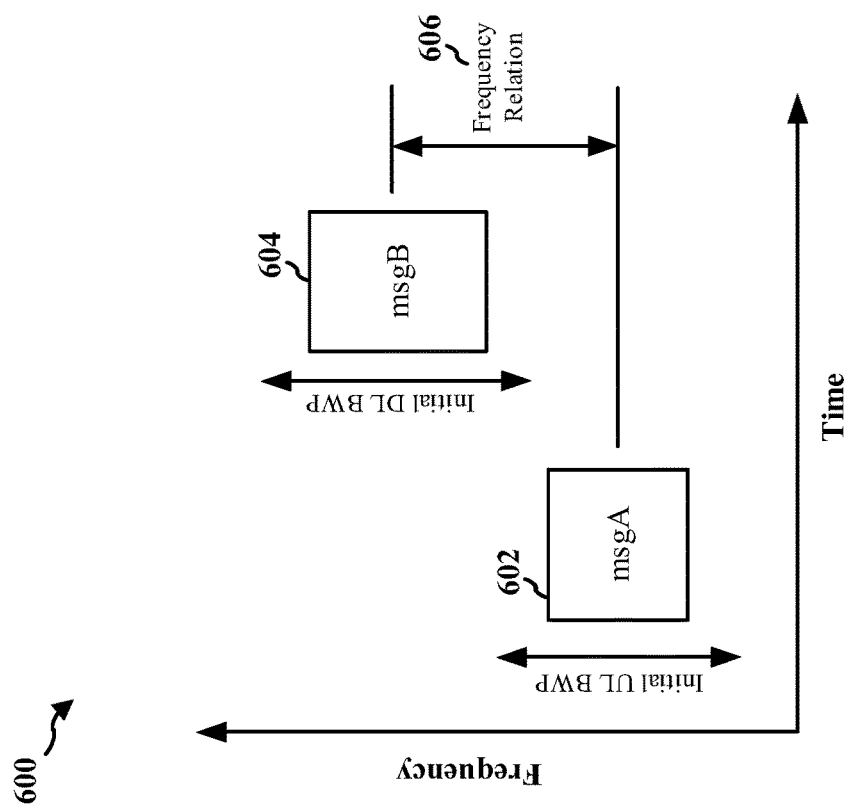
FIG. 6

TWO-STEP RACH PROCEDURE FOR NR REDUCED CAPABILITY UE

CROSS REFERENCE TO RELATED APPLICATION(S)

This application claims the benefit of U.S. Provisional Application Ser. No. 62/881,278, entitled "Two-Step RACH Procedure for NR-Light" and filed on Jul. 31, 2019, which is expressly incorporated by reference herein in its entirety.

BACKGROUND

Technical Field

The present disclosure relates generally to communication systems, and more particularly, to random access procedures in wireless communications networks.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

A random access or random access channel (RACH) procedure may be performed between a user equipment (UE) and a base station in order for the UE to connect or initialize with the base station. A UE may perform a RACH procedure with the base station under many different conditions, such as, initial access to a cell provided by the base station, during a handover sequence from one cell to another, or re-initialization with the base station to re-synchronize with the base station.

A RACH procedure may include the exchange of messages between a UE and a base station. For example, one type of RACH procedure may include the exchange of four messages between the UE and the base station, and may be referred to as a "four-step RACH procedure." Another type of RACH procedure may include the exchange of two messages between the UE and the base station, and may be referred to as a "two-step RACH procedure."

In a two-step RACH procedure the UE may send an uplink random access message in the form of a preamble portion and a payload portion to the base station to initiate the two-step RACH procedure. The base station processes the message from the UE and based on the processing results of the message from the UE, the base station may transmit a response or downlink message to the UE. Some UEs that support a two-step RACH procedure may be considered as high end devices that may utilize high bandwidth. In some instances, the preamble part and the payload part may be transmitted by the UE to the base station using different transmission configurations and/or transmission beams. These high end UEs may be configured to receive the response or downlink message transmitted by the base station which may cause the UE to perform additional or multiple processing steps to receive and/or process the downlink message. This may lead to an increase in an implementation complexity and/or increased signaling overhead. Some UEs that support a two-step RACH procedure may be considered as low end devices that may utilize a lower bandwidth, in comparison to the high end UEs. These low end devices may not be configured to support the two-step RACH procedure utilized by high end devices, due to transmit power limitations or hardware limitations, for example. Furthermore, low end devices may likely have limited coverage during the two-step RACH procedure. Aspects presented herein provide a solution to the problem of coverage limitations for low end UEs during a two-step RACH procedure by improving the manner in which a two-step RACH procedure is configured for low end UEs. In some aspects, the configuration of the RACH procedure may be optimized by including additional parameters configured for low end UEs.

In an aspects of the disclosure, a method, a computer-readable medium, and an apparatus are provided. The apparatus may be a device at a UE. The device may be a processor and/or a modem at a UE or the UE itself. The apparatus receives, from a base station, random access configuration information. The random access configuration information comprising a plurality of sets of different random access configurations. The apparatus selects one of the sets of different random access configurations. The apparatus generates a first random access message having a preamble and a payload based on the selected sets of different random access configurations. The apparatus transmits the first random access message to the base station to initiate a random access procedure.

In an aspects of the disclosure, a method, a computer-readable medium, and an apparatus are provided. The apparatus may be a device at a base station. The device may be a processor and/or a modem at a base station or the base station itself. The apparatus may transmit, to a UE, random access configuration information for a random access procedure, wherein the random access configuration information comprises a plurality of random access configurations. The apparatus may receive, from the UE, a first random access message to initiate the random access procedure, the first random access message comprising a preamble and a payload, wherein configuration of the preamble and the payload is based on one of the plurality of random access configuration. The apparatus may process the first random access message. The apparatus may generate a second random access message in response to the first random access message. The apparatus may transmit the second random access message to the UE.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first 5G NR frame, DL channels within a 5G NR subframe, a second 5G NR frame, and UL channels within a 5G NR subframe, respectively.

FIG. 6 is a diagram illustrating example of resource mapping in accordance with certain aspects of the disclosure.

DETAILED DESCRIPTION

Figure 1:
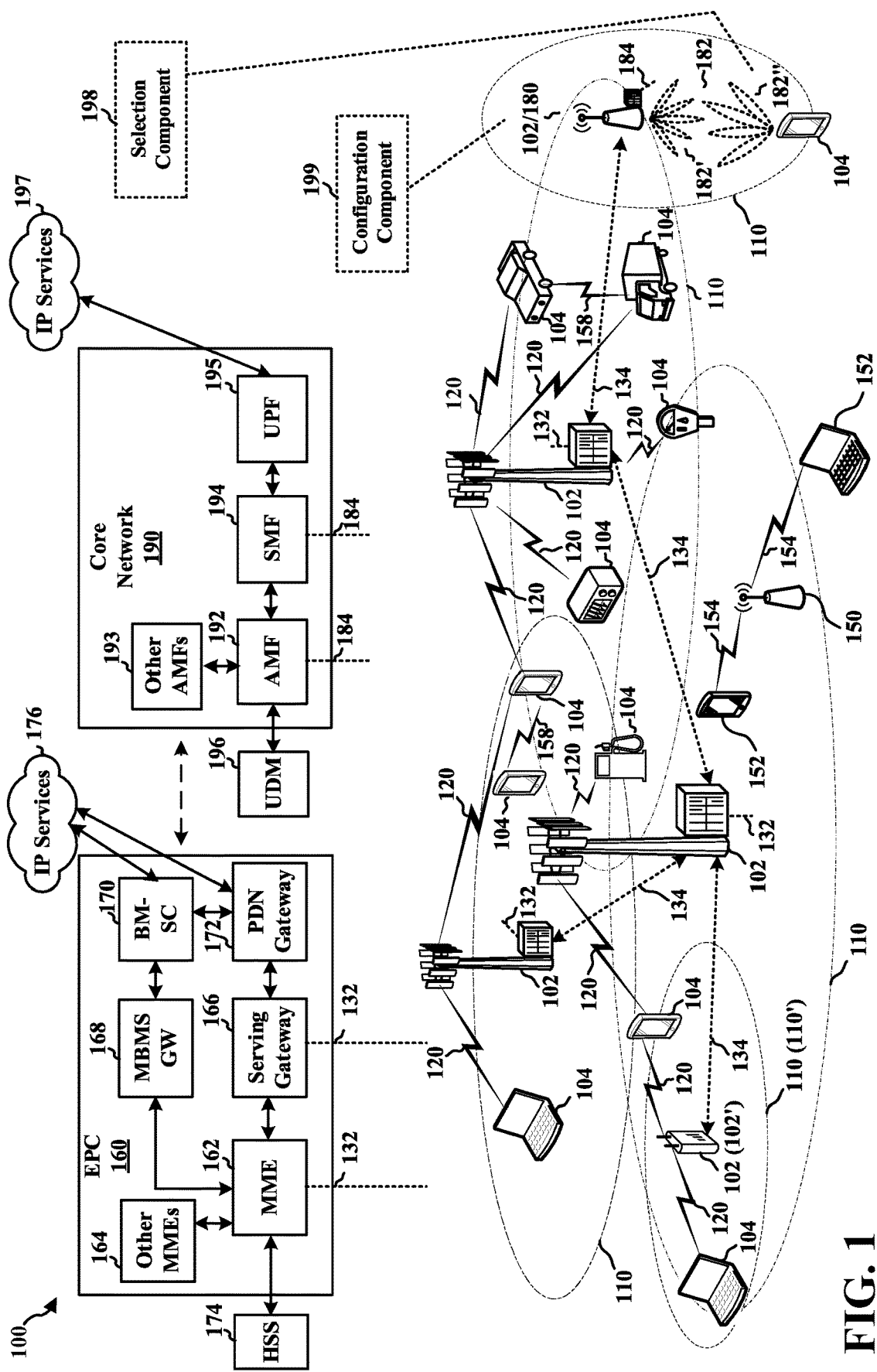
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Frequency range bands include frequency range 1 (FR1), which includes frequency bands below 7.225 GHz, and frequency range 2 (FR2), which includes frequency bands above 24.250 GHz. Communications using the mmW/near mmW radio frequency (RF) band (e.g., 3 GHz-300 GHz) has extremely high path loss and a short range. Base stations/UEs may operate within one or more frequency range bands. The mmW base station 180 may utilize beamforming 182 with the UE 104 to compensate for the extremely high path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may be configured to select random access configuration from a plurality of random access configuration that provide coverage enhancements in a two-step random access procedure. For example, the UE 104 of FIG. 1 includes a selection component 198 configured to select one of a plurality of random access configurations. The plurality of random access configurations may be part of random access configuration information received from a base station. The UE 104 may be configured to select one of the plurality of random access configurations which optimize and/or enhance coverage for a two-step RACH process. The UE 104 may generate a first random access message having a preamble and a payload, based on the selected random access configuration. The UE 104 may transmit the first random access message to the base station to initiate a random access procedure.

Referring again to FIG. 1, in certain aspects, the base station 102/180 may be configured to provide random access configuration information comprising a plurality of random access configurations to the UE which may provide coverage enhancements for the two-step RACH process, such as for UEs having limited coverage during the two-step RACH process. For example, the base station 102/180 of FIG. 1 includes a configuration component 199 configured to transmit random access configuration information. The random access configuration information may include a plurality of random access configurations that provide coverage enhancements that may be utilized by UEs having limited coverage during the two-step RACH process. The base station 102/180 may receive, from the UE 104, a first random access message to initiate the random access procedure, the first random access message comprising a preamble and a payload, wherein configuration of the preamble and the payload is based on one of the plurality of random access configuration. The base station 102/180 may process the first random access message. The base station 102/180 may generate a second random access message in response to the first random access message. The base station 102/180 may transmit the second random access message to the UE.

Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies µ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology µ, there are 14 symbols/slot and $2^\mu$ slots/subframe. The subcarrier spacing and symbol length/duration are a function of the numerology. The subcarrier spacing may be equal to $2^\mu*15$ kHz, where µ is the numerology 0 to 4. As such, the numerology µ=0 has a subcarrier spacing of 15 kHz and the numerology µ=4 has a subcarrier spacing of 240 kHz. The symbol length/duration is inversely related to the subcarrier spacing. FIGS. 2A-2D provide an example of slot configuration 0 with 14 symbols per slot and numerology µ=2 with 4 slots per subframe. The slot duration is 0.25 ms, the subcarrier spacing is 60 kHz, and the symbol duration is approximately 16.67 µs. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100× is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A PDCCH within one BWP may be referred to as a control resource set (CORESET). Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARD) ACK/NACK feedback. The PUSCH carries data, and may additionally be used to carry a buffer status report (BSR), a power headroom report (PHR), and/or UCI.

Figure 3:
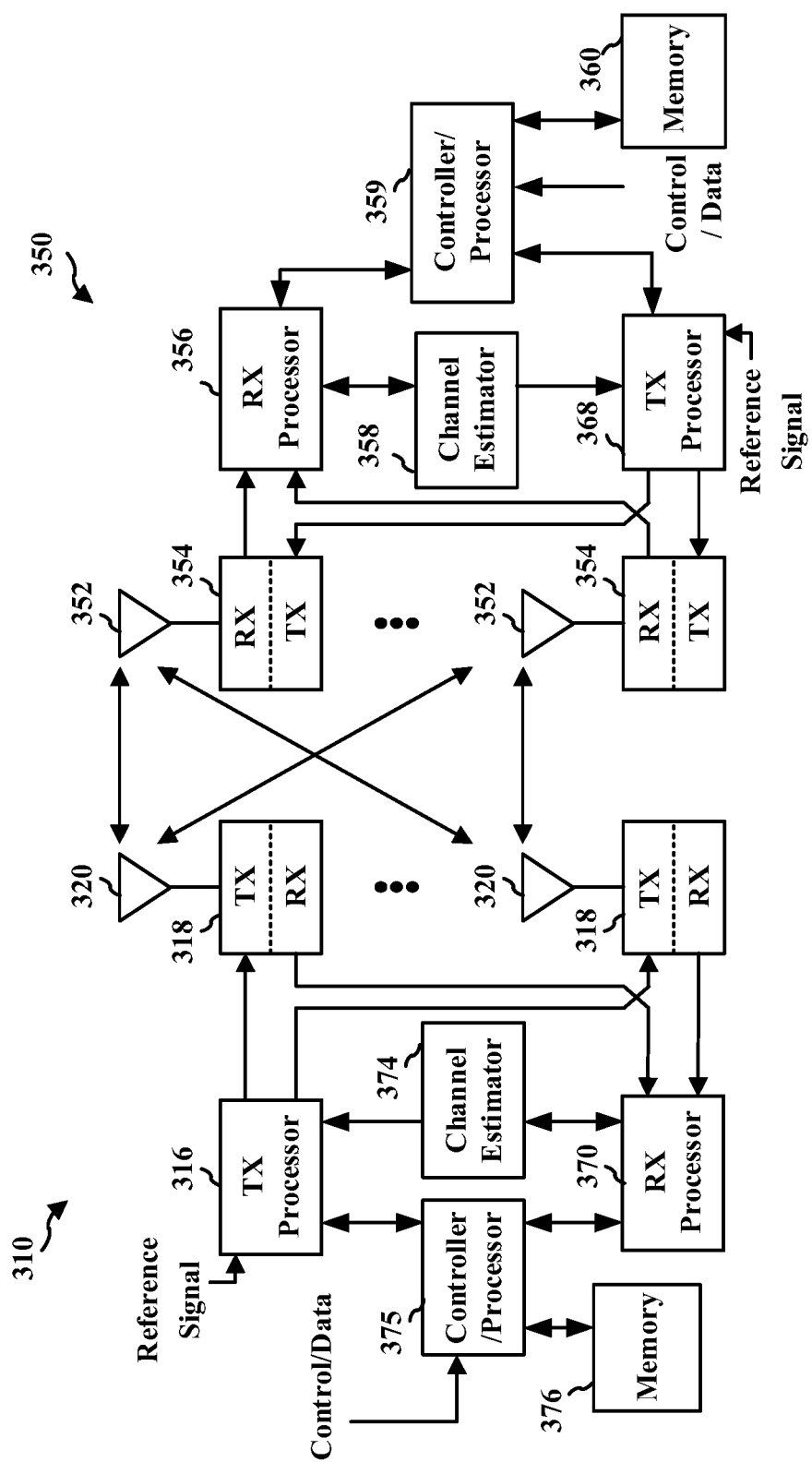
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

At least one of the TX processor 316, the RX processor 370, and the controller/processor 375 may be configured to perform aspects in connection with 199 of FIG. 1.

Figure 4:
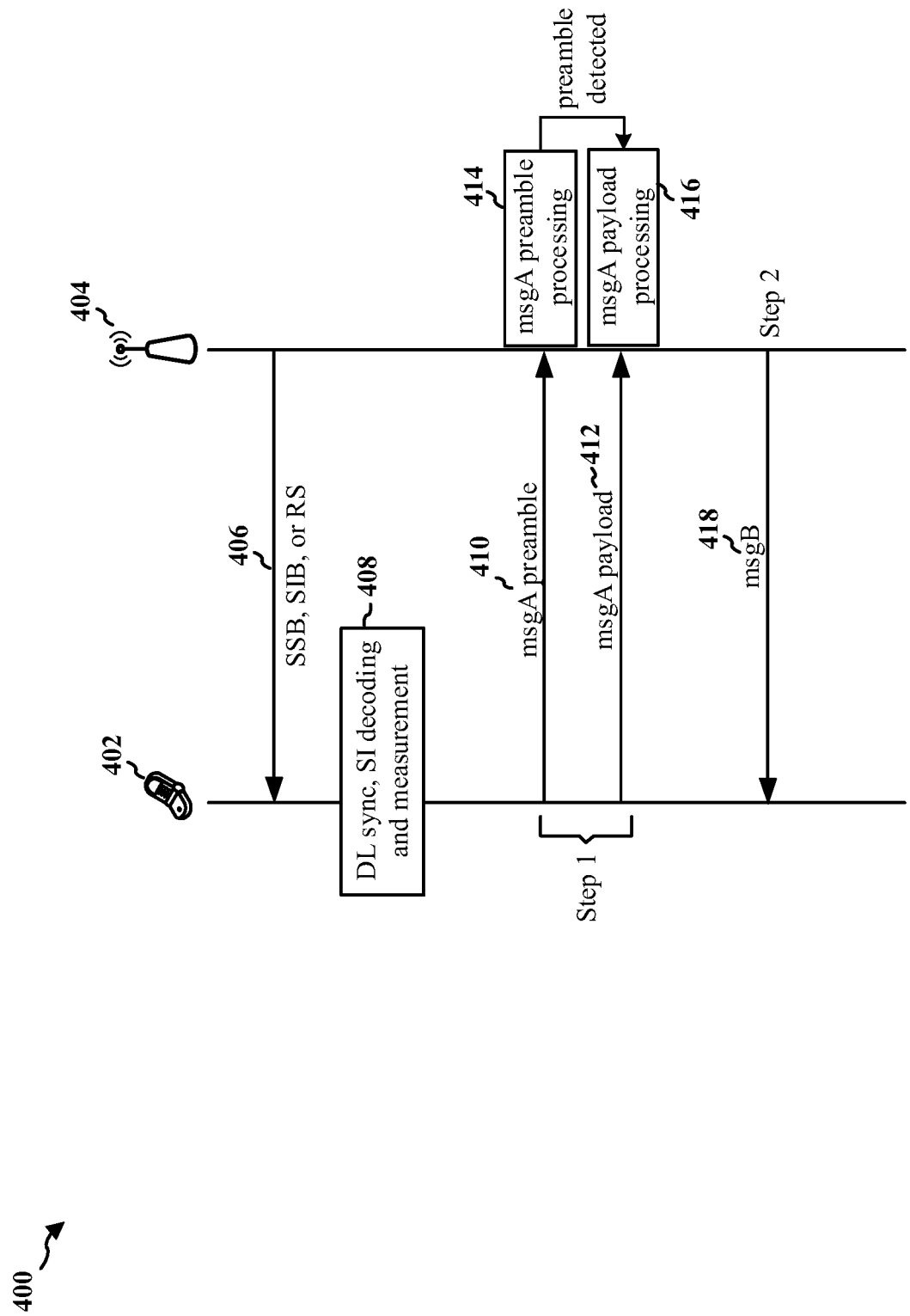
FIG. 4 is an example communication flow for a two-step random access procedure.

A UE may perform the two-step RACH procedure in order to acquire uplink synchronization and/or acquire an uplink grant for a network. FIG. 4 illustrates an example communication flow 400 between a UE 402 and a base station 404 as part of a two-step random access procedure. Prior to the beginning of a two-step RACH process, the UE may receive random access configuration information 06 from the base station. For example, the UE may receive an SSB, a SIB, and/or a reference signal broadcast by the base station. The UE may process these signals and channels and determine the configuration for the two-step RACH. For example, the UE may determine, at 408, any of a downlink synchronization based on at least one of an SSB, SIB, or reference signal; decoding information, or other measurement information for random access with the base station 404. This configuration for random access may include the messaging channel structure and other related procedures. This configuration information may be carried by the system information. In some aspects, such as when the UE is RRC connected, the configuration information for the two-step RACH procedure may be carried by both the SIB and the SSB. After the UE obtains the configuration information, the UE may generate and transmit a step 1 transmission. The step 1 transmission may comprise an uplink transmission from the UE 402 to the base station 404. The Step 1 transmission may be referred to as msgA transmission. The msgA transmission may comprise two parts, the a preamble 410 and a payload 412. The preamble 410 may be transmitted first, followed by the payload 412. The payload may include some MAC-CE, RRC messaging, or data.

When the msgA arrives at the base station, the base station will first process the preamble, at 414, and then the payload, at 416. For example, if the processing of the preamble is successful, the base station may continue to the process the payload. The base station 404 may then generate and transmit a step 2 transmission to the UE 402. The step 2 transmission may be referred to as a msgB transmission. When the preamble 410 and payload 412 are successfully decoded, the msgB 418 transmitted by the base station to the UE, may include contention resolution information. The contention resolution information can comprise or be based on the UE's unique identifier.

5G NR may initially support 5G UEs (e.g., high end UEs, such as UEs supporting eMBB or URLLC services), but may also support non-high end UEs or NR reduced capability UEs (e.g., mid-tier and/or low tier UEs). Some examples of NR reduced capability UEs may include smart wearable devices, industrial sensors, video monitoring/surveillance. NR reduced capability UEs or non-high end UEs may have lower transmit power then high end UEs (e.g., 14 dbM for NR reduced capability UEs, while high end or NR UEs have 20 dbm or higher). NR reduced capability UEs, may also have some hardware limitations in comparison to high end UEs, such as but not limited to, a reduced or limited number of receive/transmit antennas, or may have a narrow transmit/receive bandwidth. Additionally, some NR reduced capability UEs may be stationary devices and/or may be located in poor or reduced coverage locations (e.g., basement). As such, NR reduced capability UEs or non-high end UEs are likely to have limited coverage during a RACH procedure. Thus, it would be advantageous to provide coverage enhancement for two-step RACH procedure for NR reduced capability UEs or non-high end UEs while taking into consideration the coexistence between the two-step RACH process for high end UEs and NR reduced capability UEs.

Figure 5:
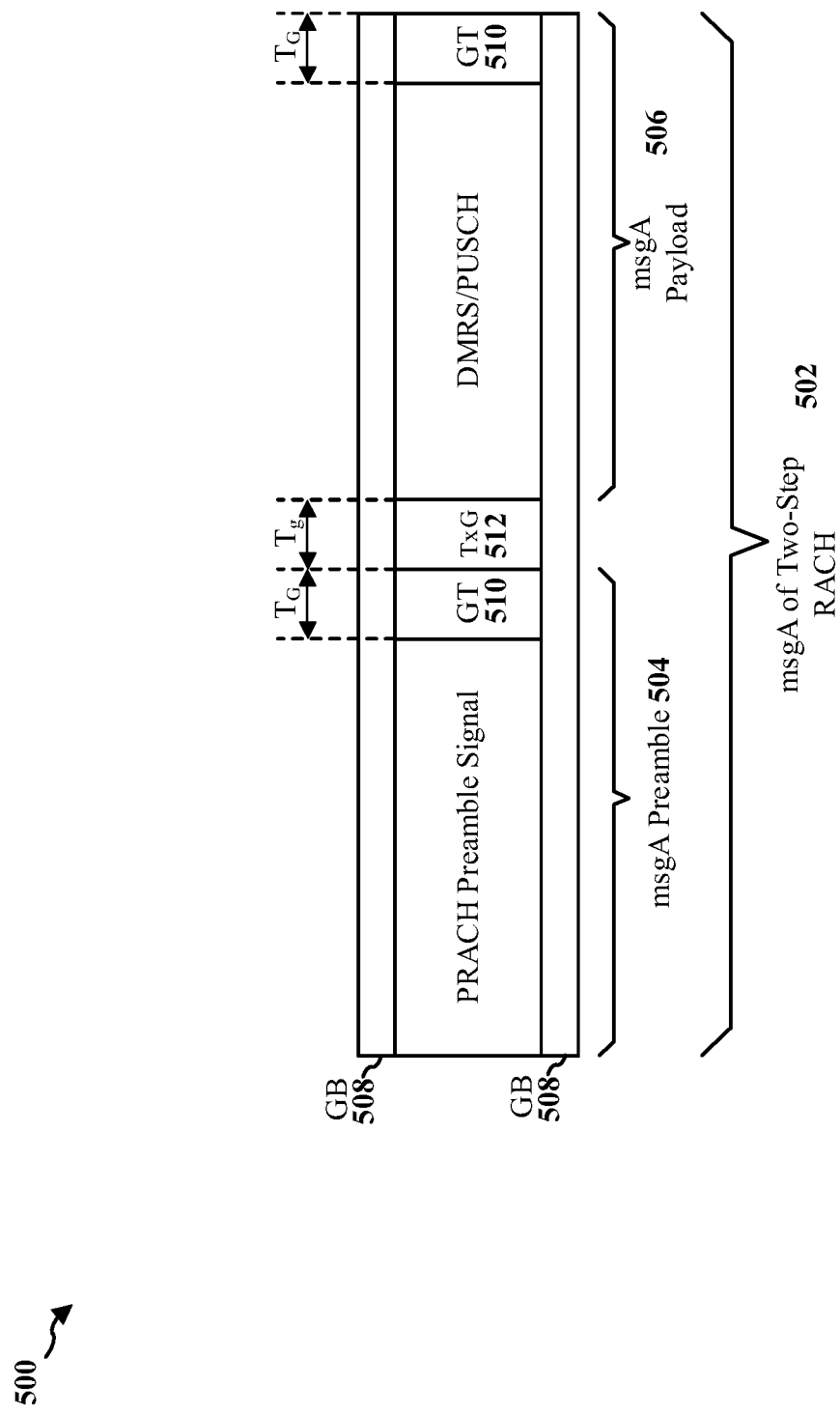
FIG. 5 is a diagram illustrating an example of a msgA channel structure in accordance with certain aspects of the disclosure.

FIG. 5 shows a logical channel structure of a msgA 502. The msgA in diagram 500 includes two parts, the msgA preamble 504 and the msgA payload 506. The msgA further includes guard bands 508. In addition, each of the preamble and payload may comprise a guard time 410 (GT) at the transmission end part. The length of the guard time 410 is denoted by $T_G$. Between the preamble 504 and payload 506 is a transmission gap 512 (TxG). The length of the TxG 512 is denoted by Tg. This value of TxG may be configurable. For example, in some aspects, such as for low latency cases, the TxG may be set to zero. While in other aspects, such as when the preamble and payload use different numerologies of different bandwidth parts (BWP), they can have different power control schemes. The inclusion of the TxG can function as a tuning gap between the preamble and the payload. The time duration of the preamble, the payload, and the transmission gap may be specified based on a reference subcarrier spacing (SCS) which refers to numerology of the carrier. The SCS may be hardcoded or broadcast in system information (SI). For example, different reference SCS may be supported in FR1 and FR2, e.g., the reference SCS in FR1 may be 15 kHz, the reference SCS in FR2 may be 60 kHz or 120 kHz. The actual numerologies used by the preamble and/or payload is broadcast in SI or RRC, which can be different from the reference SCS. When the guard time and guard band are configured for payload transmission, the time duration and bandwidth may also be specified based on the reference SCS. In some aspects, the time duration of the transmission gap and guard time may be N symbols, and the BW of the guard band may be M tones.

FIG. 6 is a diagram illustrating examples 600 and 620 of time-frequency resource mapping. In the example 600, the msgA 602 has an initial UL BWP utilized for transmitting the msgA 602 on the uplink to the base station. The msgB 604 has an initial DL BWP utilized for transmitting the msgB 604 on the downlink to the UE. In some aspects, as shown in the example 600, the initial UL BWP of msgA 602 and the initial DL BWP of msgB 604 are different, such that msgA 602 and msgB 604 have a frequency relation 606. In some aspects, some restrictions on the frequency resource allocations between msgA and msgB may be introduced such that the UE does not need to retune between the msgA transmission and/or the msgB reception. In some aspects, the frequency relation 606 or difference between a the initial UL BWP at which the msgA is transmitted and the initial DL BWP at which the msgB is received may be less than a threshold frequency difference. In some aspects, the threshold frequency difference may be 0 or a few RBs. In some aspects, the threshold frequency difference may be within a range of RBs (e.g., [−6, 6]). However, the disclosure is not intended to be limited to the aspects disclosed herein, such that the range can be greater or less than [−6, 6]. The frequency relation 606 being less than a threshold frequency difference may minimize the amount of retuning needed by the UE between the transmission of msgA and reception of msgB, which may reduce complexity of implementation. In some aspects, for example, as shown in example 620, the threshold frequency difference may be zero. In such aspects, the initial UL BWP at which the msgA is transmitted and the initial DL BWP at which the msgB is received are the same. In some aspects, the respective BWPs of msgA and msgB may have the same center frequency, such that no retuning is needed by the UE.

Figure 7:
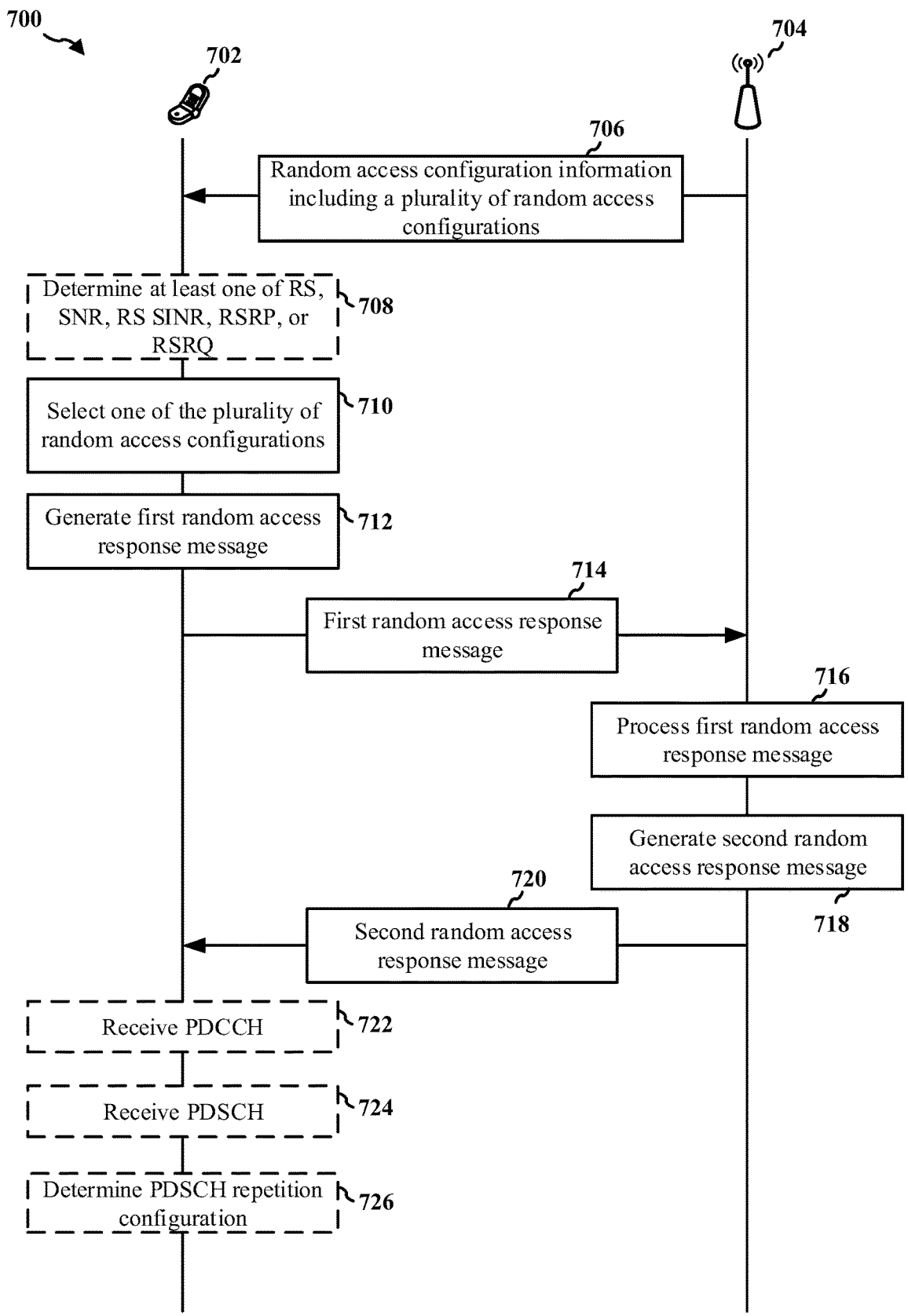
FIG. 7 is a call flow diagram illustrating an example of a two-step RACH procedure in accordance with certain aspects of the disclosure.

FIG. 7 is a call flow diagram illustrating an example of a two-step RACH procedure in accordance with certain aspects of the disclosure. The diagram 700 of FIG. 7 includes a UE 702 and a base station 704. The base station 704 may be configured to provide a cell. For example, in the context of FIG. 1, the base station 704 may correspond to base station 102/180 and, accordingly, the cell may include a geographic coverage area 110 in which communication coverage is provided and/or small cell 102' having a coverage area 110'. Further, a UE 702 may correspond to at least UE 104. In another example, in the context of FIG. 3, the base station 704 may correspond to the base station 310 and the UE 702 may correspond to UE 350. Optional aspects are illustrated with a dashed line.

The UE 702 may perform the two-step RACH procedure in order to acquire uplink synchronization, acquire an uplink grant for a network, and/or to transmit a payload to a network.

Prior to the commencement of the two-step RACH procedure, the UE 702 may receive, from the base station 704, random access configuration information 706. The random access configuration information 706 may include a plurality of random access configurations. The random access configuration information may be transmitted by the base station to the UE in the form of a downlink reference signal (RS) and/or a physical channel such as a synchronization signal block (SSB) or system information block (SIB). The UE may receive and process the random access configuration information in order to determine the configuration suitable for the two-step RACH process.

In some aspects, for example, the UE in order to determine the configuration for the two-step RACH process, may be configured to determine, at 708, at least one of a reference signal (RS) signal to noise ratio (SNR), a RS signal to interference noise ratio (SINR), a reference signal received power (RSRP), or a reference signal received quality (RSRQ). The UE may be configured to utilize such determination in determining the configuration for the two-step RACH process.

At 710, the UE may be configured to select one of the plurality of random access configurations. In some aspects, the UE may select one of the plurality of random access configurations based on the cell coverage of the UE, or synchronization signal block (SSB) RSRP measurements. For example, a UE in good cell coverage may select a first random access configuration that is suited for UEs in good coverage areas, while a UE in a poor cell coverage or along the fringe of the cell coverage may select a second random access configuration that is configured to account for the poor or reduced coverage and include parameters that compensate for the reduced coverage.

At 712, the UE may generate a first random access message comprising a preamble and a payload. In some aspects, the preamble and payload of the first random access message may be generated based on the random access configuration selected by the UE.

At 714, the UE may transmit the first random access message to the base station 704. The UE transmits the first random access message, including the preamble and payload, to the base station in order to initiate the random access procedure. In some aspects, the plurality of random access configurations may include additional parameters beyond those of conventional two-step RACH process for regular UEs (e.g., high end UEs, UEs supporting enhanced mobile broadband (eMBB) or ultra-reliable low-latency communication (URLLC) services). For example, the plurality of random access configuration may include additional parameters for non-high end UEs or mid-tier and/or low-tier UEs, such as but not limited to smart wearable devices, industrial sensors, video monitoring/surveillance, for transmission of the preamble and/or payload of the first random access message. For example, the parameters may include at least one of a preamble numerology, a preamble format, a cyclic shift for a preamble sequence, an initial transmit power for the preamble, or a power control step size. In another example, the parameters may include at least one of a PUSCH resource unit, a PUSCH waveform, a PUSCH initial transmit power, a frequency hopping pattern, a repetition factor, a modulation coding scheme, or a power control step size. In some aspects, the preamble and the payload of the first random access message are transmitted on a same transmission beam. In some aspects, at least one of the plurality of random access configurations may comprise contention-based parameters for transmitting the first random access message in a contention based random access procedure. In such aspects, some UEs (e.g., non-high end UEs) may reuse existing configurations for two-step RACH for high end UEs with some additional contention-based parameters added. For example, the contention-based parameters may include at least one of a physical random access channel (PRACH) repetition, a physical uplink shared channel (PUSCH) repetition, power boosting for PRACH or PUSCH, a power control step size, or a combination thereof. In such aspects, the first random access message may be transmitted on resources allocated for a set of UEs for a contention based random access procedure. In some aspects, contention-free RACH may be supported for non-high end UEs, such that at least one of the plurality of random access configurations may comprise contention-free parameters for transmitting the first random access message in a contention free random access procedure. For example, the contention-free parameters may include at least one of a PRACH repetition, a PUSCH repetition, power boosting for PRACH or PUSCH, a power control step size, or a combination thereof. In such aspects, the first random access message may be transmitted on resources allocated specifically for the UE for a contention free random access procedure. In some aspects, some of the random access configurations may be configured to support a transmission beam change between the preamble and payload of the first random access message. For example, in some aspects, the beam (e.g., spatial uplink filter) utilized to transmit the payload of the first random access message may be the same as the beam used to transmit the preamble. In some aspects, the UE may be configured to use a different transmission beam when transmitting the preamble and when transmitting the payload. However, in some aspects, the UE may be configured to utilize the same beam to transmit the preamble and the payload, such that transmission beam switching between the preamble and payload may be disabled for non-high end UEs. Disabling the transmission beam switching allows for a reduction of complexity of implementation for non-high end UEs.

The base station 704 may receive the first random access message from the UE, including the preamble and the payload. The configuration of the preamble and the payload may be based on one of the plurality of random access configurations. After receiving the first random access message, the base station 704, at 716, may process the first random access message.

At 718, the base station may generate a second random access message. The base station generates the second random access message in response to the first random access message. The base station may generate the second random access message after processing the preamble and payload of the first random access message.

At 720, the base station may transmit the second random access message to the UE. In some aspects, a PDCCH of the second random access message may be transmitted based on a subset of PDCCH ALs in response to the first random access message. For example, the subset of the PDCCH ALs may include at least one of AL8 or AL16. In some aspects, a PDSCH of the second random access message may be transmitted in response to the first random access message. In some aspects, the PDSCH may be transmitted based on a PDSCH repetition.

At 722, the UE may be configured to receive the PDCCH of the second random access message. The UE may be configured to use blind detection to receive the PDCCH of the second random access message based on the subset of PDCCH ALs, such as, for example, at least one of AL8 or AL16. In some aspects, the PDCCH ALs may be limited to AL8 and AL16. Having the subset of PDCCH ALs to be AL8 or AL16 allows for the extension of PDCCH coverage and reduces the UE complexity on PDCCH detection.

At 724, the UE may be configured to receive the PDSCH of the second random access message. The UE receives the PDSCH of the second random access message in response to the first random access message. In some aspects, a frequency difference between a first frequency at which the first random access message is transmitted and a second frequency at which the second random access message is received is less than a threshold frequency difference. In some aspects, the threshold frequency difference between the first frequency at which the first random access message is transmitted and the second frequency at which the second random access message is received is zero. In such aspects, the first frequency at which first random access message is transmitted and the second frequency at which the second random access message is received is the same.

At 726, the UE may be configured to determine a PDSCH repetition configuration. In some aspects, the PDSCH may be received by the UE based on the PDSCH repetition. Determining the PDSCH repetition configuration may allow for the extension of the PDSCH coverage. In some aspects, the PDSCH repetition configuration may be indicated in the PDCCH, can be fixed for non-high end UEs, or can be RRC configured.

Figure 8:
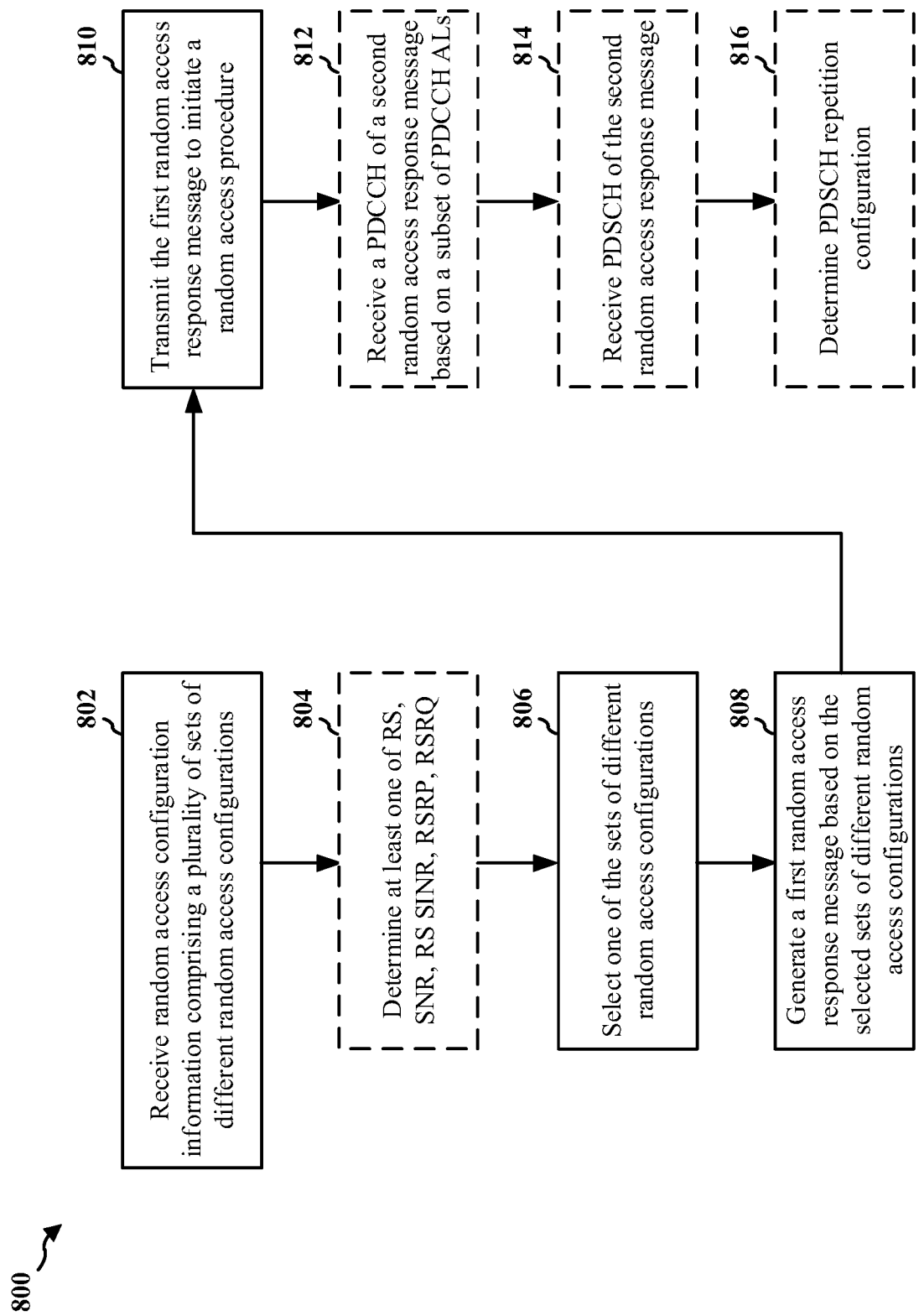
FIG. 8 is a flow chart of a method of wireless communication.

FIG. 8 is a flowchart 800 of a method of wireless communication. The method may be performed by a UE or a component of a UE (e.g., the UE 104, 402, 702; the apparatus 902; the cellular baseband component 904, which may include the memory 360 and which may be the entire UE 350 or a component of the UE 350, such as the TX processor 368, the RX processor 356, and/or the controller/processor 359). According to various aspects, one or more of the illustrated operations of the method 800 may be omitted, transposed, and/or contemporaneously performed. The UE may implement the method of diagram 700. Optional aspects are illustrated with a dashed line. The method may enable a UE to select random access configurations that may provide coverage enhancements for a two-step RACH procedure.

At 802, the UE may receive random access configuration information. For example, 802 may be performed by configuration component 940 of apparatus 902. The UE may receive the random access configuration information from the base station. The random access configuration information may include a plurality of random access configurations.

In some aspects, for example at 804, the UE may determine at least one of a RS SNR, a RS SINR, a RSRP, or a RSRQ. For example, 804 may be performed by determination component 942 of apparatus 902. In some aspects, the UE may select one of the plurality of random access configurations based on the determination of at least one of the RS SNR, the RS SINR, the RSRP, or the RSRQ.

At 806, the UE may select one of the plurality of random access configurations. For example, 806 may be performed by selection component 944 of apparatus 902. In some aspects, the UE may select one of the plurality of random access configurations based on the cell quality of the UE, or SSB RSRP measurements.

At 808, the UE may generate a first random access message having a preamble and a payload. For example, 808 may be performed by generation component 946 of apparatus 902. In some aspects, the first random access message may be generated based on the selected random access configuration.

At 810, the UE may transmit the first random access message to a base station. For example, 810 may be performed by RACH component 948 of apparatus 902. The UE may transmit the first random access message to the base station to initiate a random access procedure. In some aspects, the plurality of random access configurations may include parameters for transmission of the first random access message. The parameters may include at least one of a preamble numerology, a preamble format, a cyclic shift for a preamble sequence, an initial transmit power for the preamble, or a power control step size. In some aspects, the plurality of random access configurations include parameters for transmission of the first random access message. The parameters may include at least one of a PUSCH resource unit, a PUSCH waveform, a PUSCH initial transmit power, a frequency hopping pattern, a repetition factor, a modulation coding scheme, or a power control step size. The parameters for transmission of the first random access message may be applicable to the preamble or the payload of the first random access message. In some aspects, the preamble and the payload of the first random access message are transmitted on a same transmission beam.

In some aspects, at least one of the plurality of random access configurations may comprise contention-based parameters for transmitting the first random access message in a contention based random access procedure. For example, the contention-based parameters may include at least one of a PRACH repetition, a PUSCH repetition, power boosting for PRACH or PUSCH, a power control step size, or a combination thereof. In such aspects, the first random access message may be transmitted on resources allocated for a set of UEs for a contention based random access procedure. In some aspects, at least one of the plurality of random access configurations may comprise contention-free parameters for transmitting the first random access message in a contention free random access procedure. For example, the contention-free parameters may include at least one of a PRACH repetition, a PUSCH repetition, power boosting for PRACH or PUSCH, a power control step size, or a combination thereof. In such aspects, the first random access message may be transmitted on resources allocated specifically for the UE for a contention free random access procedure.

In some aspects, for example at 812, the UE may receive a PDCCH of a second random access message. For example, 812 may be performed by PDCCH component 950 of apparatus 902. The UE may receive the PDCCH of the second random access message by using blind detection based on a subset of PDCCH aggregation levels (ALs) in response to the first random access message. In some aspects, the subset of the PDCCH ALs may include at least one of AL8 or AL16.

In some aspects, for example at 814, the UE may receive a PDSCH of the second random access message. For example, 812 may be performed by PDSCH component 952 of apparatus 902. The UE may receive the PDSCH of the second random access message in response to the first random access message. In some aspects, a frequency difference between a first frequency at which the first random access message is transmitted and a second frequency at which the second random access message is received is less than a threshold frequency difference. In some aspects, the threshold frequency difference between the first frequency at which the first random access message is transmitted and the second frequency at which the second random access message is received is zero. In such aspects, the first frequency at which first random access message is transmitted and the second frequency at which the second random access message is received is the same.

In some aspects, for example at 816, the UE may determine a PDSCH repetition configuration. For example, 816 may be performed by repetition component 954 of apparatus 902. In some aspects, the PDSCH may be received by the UE based on the PDSCH repetition.

Figure 9:
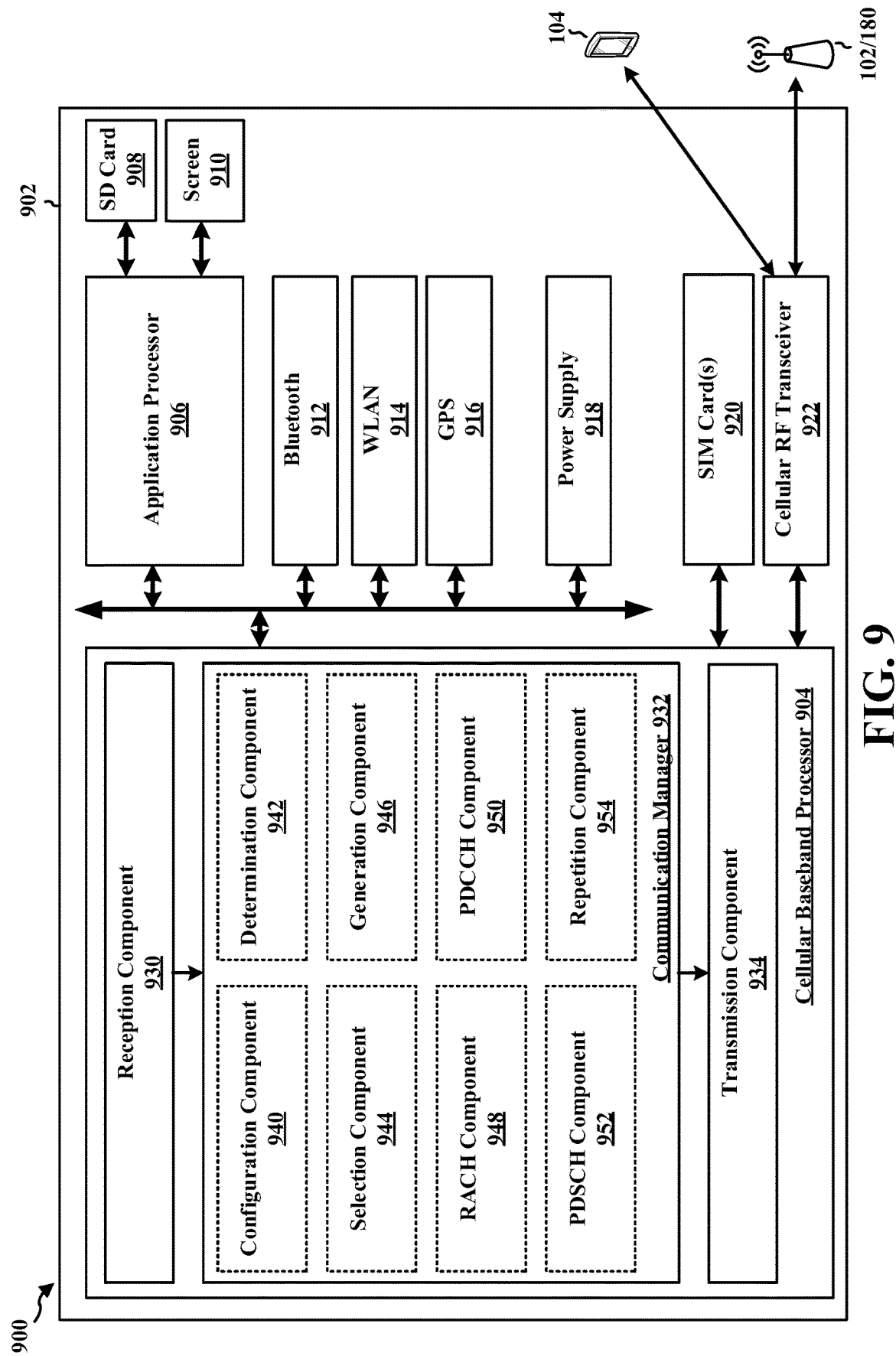
FIG. 9 is a diagram illustrating an example of a hardware implementation for an example apparatus.

FIG. 9 is a diagram 900 illustrating an example of a hardware implementation for an apparatus 902. The apparatus 902 is a UE and includes a cellular baseband processor 904 (also referred to as a modem) coupled to a cellular RF transceiver 922 and one or more subscriber identity modules (SIM) cards 920, an application processor 906 coupled to a secure digital (SD) card 908 and a screen 910, a Bluetooth module 912, a wireless local area network (WLAN) module 914, a Global Positioning System (GPS) module 916, and a power supply 918. The cellular baseband processor 904 communicates through the cellular RF transceiver 922 with the UE 104 and/or BS 102/180. The cellular baseband processor 904 may include a computer-readable medium/memory. The computer-readable medium/memory may be non-transitory. The cellular baseband processor 904 is responsible for general processing, including the execution of software stored on the computer-readable medium/memory. The software, when executed by the cellular baseband processor 904, causes the cellular baseband processor 904 to perform the various functions described supra. The computer-readable medium/memory may also be used for storing data that is manipulated by the cellular baseband processor 904 when executing software. The cellular baseband processor 904 further includes a reception component 930, a communication manager 932, and a transmission component 934. The communication manager 932 includes the one or more illustrated components. The components within the communication manager 932 may be stored in the computer-readable medium/memory and/or configured as hardware within the cellular baseband processor 904. The cellular baseband processor 904 may be a component of the UE 350 and may include the memory 360 and/or at least one of the TX processor 368, the RX processor 356, and the controller/processor 359. In one configuration, the apparatus 902 may be a modem chip and include just the baseband processor 904, and in another configuration, the apparatus 902 may be the entire UE (e.g., see 350 of FIG. 3) and include the aforediscussed additional modules of the apparatus 902.

The communication manager 932 includes a configuration component 940 that is configured to receive random access configuration information, e.g., as described in connection with 802 of FIG. 8. The communication manager 932 further includes a determination component 942 that is configured to determine at least one of a RS SNR, a RS SINR, a RSRP, or a RSRQ, e.g., as described in connection with 804 of FIG. 8. The communication manager 932 further includes a selection component 944 that is configured to select one of the plurality of random access configurations, e.g., as described in connection with 806 of FIG. 8. The communication manager 932 further includes a generation component 946 that is configured to generate a first random access message having a preamble and a payload, e.g., as described in connection with 808 of FIG. 8. The communication manager 932 further includes a RACH component 948 that is configured to transmit the first random access message to a base station, e.g., as described in connection with 810 of FIG. 8. The communication manager 932 further includes a PDCCH component 950 that is configured to receive a PDCCH of a second random access message, e.g., as described in connection with 812 of FIG. 8. The communication manager 932 further includes a PDSCH component 952 that is configured to receive a PDSCH of the second random access message, e.g., as described in connection with 814 of FIG. 8. The communication manager 932 further includes a repetition component 954 that is configured to determine a PDSCH repetition configuration, e.g., as described in connection with 816 of FIG. 8.

The apparatus may include additional components that perform each of the blocks of the algorithm in the aforementioned flowchart of FIG. 8. As such, each block in the aforementioned flowchart of FIG. 8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 902, and in particular the cellular baseband processor 904, includes means for receiving, from a base station, random access configuration information, the random access configuration information comprising a plurality of random access configurations. The apparatus includes means for selecting, by the UE, one of the plurality of random access configurations. The apparatus includes means for generating a first random access message having a preamble and a payload, based on the selected random access configuration. The apparatus includes means for transmitting the first random access message to the base station to initiate a random access procedure. The apparatus further includes means for determining at least one of an RS SNR, an RS SINR, an RSRP, or an RSRQ. The UE selects one of the plurality of random access configurations based on the determination. The apparatus further includes means for receiving using blind detection a PDCCH of a second random access message based on a subset of PDCCH ALs in response to the first random access message. The apparatus further includes means for receiving a PDSCH of the second random access message in response to the first random access message. The apparatus further includes means for determining a PDSCH repetition configuration, wherein the PDSCH is received based on the PDSCH repetition. The aforementioned means may be one or more of the aforementioned components of the apparatus 902 configured to perform the functions recited by the aforementioned means. As described supra, the apparatus 902 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 10:
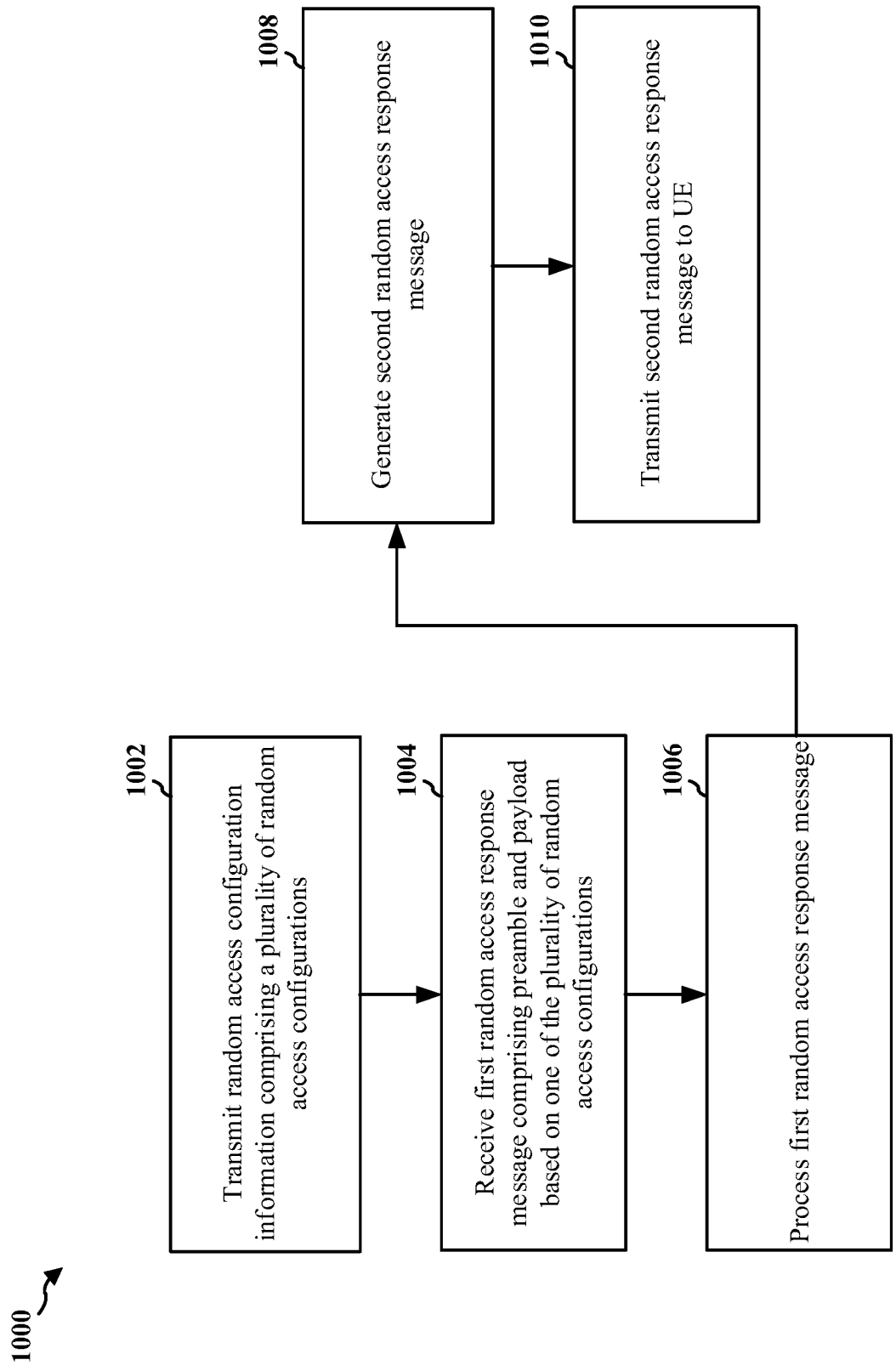
FIG. 10 is a flowchart of a method of wireless communication.

FIG. 10 is a flowchart 1000 of a method of wireless communication. The method may be performed by a base station or a component of a base station (e.g., the base station 102/180, 404, 704; the apparatus 1102; the baseband unit 1104, which may include the memory 376 and which may be the entire base station 310 or a component of the base station 310, such as the TX processor 316, the RX processor 370, and/or the controller/processor 375). According to various aspects, one or more of the illustrated operations of the method 1000 may be omitted, transposed, and/or contemporaneously performed. The base station may implement the method of diagram 700. The method may enable a base station to provide multiple random access configurations to a UE that may provide coverage enhancements for a two-step RACH procedure.

At 1002, the base station may transmit random access configuration information for a random access procedure. For example, 1002 may be performed by configuration component 1140 of apparatus 1102. The random access configuration information may comprise a plurality of random access configurations.

At 1004, the base station may receive a first random access message to initiate a random access procedure. For example, 1004 may be performed by $1^{st}$ random access message component 1142 of apparatus 1102. The base station may receive the first random access message from a UE. The first random access message may comprise a preamble and a payload. In some aspects, the configuration of the preamble and the payload may be based on one of the plurality of random access configurations. In some aspects, the plurality of random access configurations include parameters for transmission of the first random access message. For example, the parameters may include at least one of a preamble numerology, a preamble format, a cyclic shift for a preamble sequence, an initial transmit power for the preamble, or a power control step size. In some aspects, the parameters may include at least one of a PUSCH resource unit, a PUSCH waveform, a PUSCH initial transmit power, a frequency hopping pattern, a repetition factor, a modulation coding scheme, or a power control step size. In some aspects, the preamble and the payload of the first random access message are received on a same reception beam. In some aspects, at least one of the plurality of random access configurations comprise contention-based parameters for transmitting the first random access message in a contention based random access procedure. For example, the contention-based parameters may include at least one of a PRACH repetition, a PUSCH repetition, power boosting for PRACH or PUSCH, a power control step size, or a combination thereof, such that the first random access message is transmitted on resources allocated for a set of UEs for the contention based random access procedure. In some aspects, at least one of the plurality of random access configurations comprise contention-free parameters for transmitting the first random access message in a contention free random access procedure. For example, the contention-based parameters may include at least one of a PRACH repetition, a PUSCH repetition, power boosting for PRACH or PUSCH, a power control step size, or a combination thereof, such that the first random access message is transmitted on resources allocated specifically for the UE for the contention free random access procedure. In some aspects, a frequency difference between a first frequency at which the first random access message is received and a second frequency at which the second random access message is transmitted may be less than a threshold frequency difference. In some aspects, the threshold frequency difference is zero, such that the first frequency at which first random access message is received and the second frequency at which the second random access message is transmitted are the same.

At 1006, the base station may process the first random access message. For example, 1006 may be performed by processing component 1144 of apparatus 1102. In some aspects, the base station may process the preamble of the first random access message, and upon detection of the preamble, the base station may then process the payload of the first random access message.

At 1008, the base station may generate a second random access message. For example, 1008 may be performed by generation component 1146 of apparatus 1102. The base station generates the second random access message in response to the first random access message. The base station may generate the second random access message after processing the preamble and payload of the first random access message.

At 1010, the base station may transmit the second random access message to the UE. For example, 1010 may be performed by $2^{nd}$ random access message component 1148 of apparatus 1102. In some aspects, a PDCCH of the second random access message may be transmitted based on a subset of PDCCH ALs in response to the first random access message. For example, the subset of the PDCCH ALs may include at least one of AL8 or AL16. In some aspects, a PDSCH of the second random access message may be transmitted in response to the first random access message. In some aspects, the PDSCH may be transmitted based on a PDSCH repetition.

Figure 11:
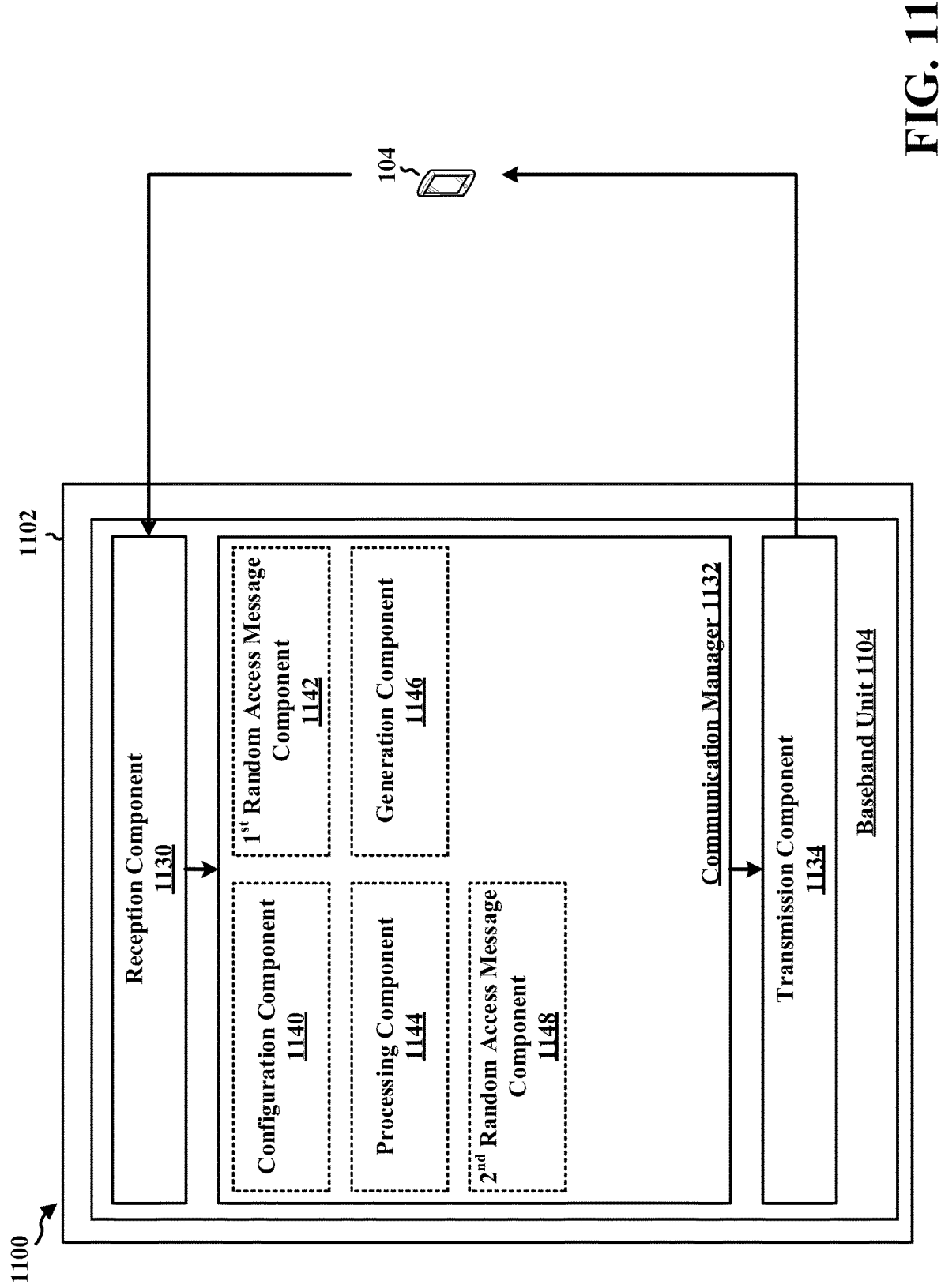
FIG. 11 is a diagram illustrating an example of a hardware implementation for an example apparatus.

FIG. 11 is a diagram 1100 illustrating an example of a hardware implementation for an apparatus 1102. The apparatus 1102 is a BS and includes a baseband unit 1104. The baseband unit 1104 may communicate through a cellular RF transceiver with the UE 104. The baseband unit 1104 may include a computer-readable medium/memory. The baseband unit 1104 is responsible for general processing, including the execution of software stored on the computer-readable medium/memory. The software, when executed by the baseband unit 1104, causes the baseband unit 1104 to perform the various functions described supra. The computer-readable medium/memory may also be used for storing data that is manipulated by the baseband unit 1104 when executing software. The baseband unit 1104 further includes a reception component 1130, a communication manager 1132, and a transmission component 1134. The communication manager 1132 includes the one or more illustrated components. The components within the communication manager 1132 may be stored in the computer-readable medium/memory and/or configured as hardware within the baseband unit 1104. The baseband unit 1104 may be a component of the BS 310 and may include the memory 376 and/or at least one of the TX processor 316, the RX processor 370, and the controller/processor 375.

The communication manager 1132 includes a configuration component 1140 that may transmit random access configuration information for a random access procedure, e.g., as described in connection with 1002 of FIG. 10. The communication manager 1132 further includes a $1^{st}$ random access message component 1142 that may receive a first random access message to initiate a random access procedure, e.g., as described in connection with 1004 of FIG. 10. The communication manager 1132 further includes a processing component 1144 that may process the first random access message, e.g., as described in connection with 1006 of FIG. 10. The communication manager 1132 further includes a generation component 1146 that may generate a second random access message, e.g., as described in connection with 1008 of FIG. 10. The communication manager 1134 further includes a $2^{nd}$ random access message component 1148 that may transmit the second random access message to the UE, e.g., as described in connection with 1010 of FIG. 10.

The apparatus may include additional components that perform each of the blocks of the algorithm in the aforementioned flowchart of FIG. 10. As such, each block in the aforementioned flowchart of FIG. 10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1102, and in particular the baseband unit 1104, includes means for transmitting, to a UE, random access configuration information for a random access procedure, wherein the random access configuration information comprises a plurality of random access configurations. The apparatus includes means for receiving, from the UE, a first random access message to initiate the random access procedure, the first random access message comprising a preamble and a payload, wherein configuration of the preamble and the payload is based on one of the plurality of random access configuration. The apparatus includes means for processing the first random access message. The apparatus includes means for generating a second random access message in response to the first random access message. The apparatus includes means for transmitting the second random access message to the UE. The aforementioned means may be one or more of the aforementioned components of the apparatus 1102 configured to perform the functions recited by the aforementioned means. As described supra, the apparatus 1102 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

The present disclosure relates to coverage enhancements for two-step RACH procedures for non-high end or low end UEs (e.g., NR reduced capability UEs). These low end devices may not be configured to support the two-step RACH procedure utilized by high end devices (e.g., NR UEs), due to transmit power limitations or hardware limitations, for example. Furthermore, low end devices may likely have limited coverage during the two-step RACH procedure. Aspects presented herein provide a solution to the problem of coverage limitations for low end UEs during a two-step RACH procedure by improving the manner in which a two-step RACH procedure is configured for low end UEs. In some aspects, the configuration of the RACH procedure may be optimized by including additional parameters configured for low end UEs. At least one advantage is that the disclosure provides random access configuration information that includes a plurality of random access configurations. The plurality of random access configurations may be utilized by non-high end UEs (e.g., NR reduced capability UEs) that enhance or optimize the two-step RACH procedure. At least another advantage of the disclosure is that the random access configuration may be configured to reduce the complexity of implementation for the non-high end UEs. For example, transmission beam switching between the preamble and payload may be disabled for non-high end UEs, or may be configured to use the same transmission beam to transmit the preamble and the payload. In another example, the frequency relation between the initial UL BWP of the first random access message and the initial DL BWP of the second random access message may be minimal or zero, such that the UE does not have to retune between the transmission of the first random access message and the reception of the second random access message. Yet another advantage of the disclosure is that the plurality of random access configuration may also be utilized by high end UEs (e.g., NR UEs), such as when high end UEs have a reduced or poor coverage.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The following examples are illustrative only and may be combined with aspects of other embodiments or teaching described herein, without limitation.

Example 1 is a method of wireless communication at a UE comprising receiving, from a base station, random access configuration information, the random access configuration information comprising a plurality of random access configurations; selecting, by the UE, one of the plurality of random access configurations; generating a first random access message having a preamble and a payload, based on the selected random access configuration; and transmitting the first random access message to the base station to initiate a random access procedure.

In Example 2, the method of Example 1 further includes determining at least one of a reference signal (RS) signal to noise ratio (SNR), a RS signal to interference noise ratio (SINR), a reference signal received power (RSRP), or a reference signal received quality (RSRQ), wherein the UE selects one of the plurality of random access configurations based on the determination.

In Example 3, the method of Example 1 or 2 further includes that the plurality of random access configurations include parameters for transmission of the first random access message, the parameters including at least one of a preamble numerology, a preamble format, a cyclic shift for a preamble sequence, an initial transmit power for the preamble, or a power control step size.

In Example 4, the method of any of Examples 1-3 further includes that the plurality of random access configurations include parameters for transmission of the first random access message, the parameters including at least one of a PUSCH resource unit, a PUSCH waveform, a PUSCH initial transmit power, a frequency hopping pattern, a repetition factor, a modulation coding scheme, or a power control step size.

In Example 5, the method of any of Examples 1-4 further includes that the preamble and the payload of the first random access message are transmitted on a same transmission beam.

In Example 6, the method of any of Examples 1-5 further includes that at least one of the plurality of random access configurations comprise contention-based parameters for transmitting the first random access message in a contention based random access procedure, wherein the contention-based parameters includes at least one of a PRACH repetition, a PUSCH repetition, power boosting for PRACH or PUSCH, or a power control step size, wherein the first random access message is transmitted on resources allocated for a set of UEs for a contention based random access procedure.

In Example 7, the method of any of Examples 1-6 further includes that at least one of the plurality of random access configurations comprise contention-free parameters for transmitting the first random access message in a contention free random access procedure, wherein the contention-free parameters includes at least one of a physical random access channel (PRACH) repetition, a physical uplink shared channel (PUSCH) repetition, power boosting for PRACH or PUSCH, or a power control step size, wherein the first random access message is transmitted on resources allocated specifically for the UE for a contention free random access procedure.

In Example 8, the method of any of Examples 1-7 further includes receiving a PDCCH of a second random access message based on a subset of PDCCH ALs in response to the first random access message; and receiving a PDSCH of the second random access message in response to the first random access message.

In Example 9, the method of any of Examples 1-8 further includes that the subset of the PDCCH ALs includes at least one of AL8 or AL16.

In Example 10, the method of any of Examples 1-9 further includes determining a PDSCH repetition configuration, wherein the PDSCH is received based on the PDSCH repetition.

In Example 11, the method of any of Examples 1-10 further includes that a frequency difference between a first frequency at which the first random access message is transmitted and a second frequency at which the second random access message is received is less than a threshold frequency difference.

In Example 12, the method of any of Examples 1-11 further includes that the threshold frequency difference is zero, wherein the first frequency at which first random access message is transmitted and the second frequency at which the second random access message is received is the same.

Example 13 is a device including one or more processors and one or more memories in electronic communication with the one or more processors storing instructions executable by the one or more processors to cause the system or apparatus to implement a method as in any of Examples 1-12.

Example 14 is a system or apparatus including means for implementing a method or realizing an apparatus as in any of Examples 1-12.

Example 15 is a non-transitory computer readable medium storing instructions executable by one or more processors to cause the one or more processors to implement a method as in any of Examples 1-12.

Example 16 is a method of wireless communication at a base station comprising transmitting, to a user equipment (UE), random access configuration information for a random access procedure, wherein the random access configuration information comprises a plurality of random access configurations; receiving, from the UE, a first random access message to initiate the random access procedure, the first random access message comprising a preamble and a payload, wherein configuration of the preamble and the payload is based on one of the plurality of random access configuration; processing the first random access message; generating a second random access message in response to the first random access message; and transmitting the second random access message to the UE.

In Example 17, the method of Example 16 further includes that the plurality of random access configurations include parameters for transmission of the first random access message, the parameters including at least one of a preamble numerology, a preamble format, a cyclic shift for a preamble sequence, an initial transmit power for the preamble, or a power control step size.

In Example 18, the method of Examples 16 or 17 further includes that the plurality of random access configurations include parameters for transmission of the first random access message, the parameters including at least one of a physical uplink shared channel (PUSCH) resource unit, a PUSCH waveform, a PUSCH initial transmit power, a frequency hopping pattern, a repetition factor, a modulation coding scheme, or a power control step size.

In Example 19, the method of any of Examples 16-18 further includes that the preamble and the payload of the first random access message are received on a same reception beam.

In Example 20, the method of any of Examples 16-19 further includes that at least one of the plurality of random access configurations comprise contention-based parameters for transmitting the first random access message in a contention based random access procedure, wherein the contention-based parameters include at least one of a physical random access channel (PRACH) repetition, a physical uplink shared channel (PUSCH) repetition, power boosting for PRACH or PUSCH, a power control step size, wherein the first random access message is transmitted on resources allocated for a set of UEs for the contention based random access procedure.

Example 21 is a device including one or more processors and one or more memories in electronic communication with the one or more processors storing instructions executable by the one or more processors to cause the system or apparatus to implement a method as in any of Examples 16-20.

Example 22 is a system or apparatus including means for implementing a method or realizing an apparatus as in any of Examples 16-20.

Example 23 is a non-transitory computer readable medium storing instructions executable by one or more processors to cause the one or more processors to implement a method as in any of Examples 16-20.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication performed by a user equipment (UE), the method comprising:
   receiving, from a network entity, random access configuration information comprising a plurality of random access configurations associated with a specific type of random access procedure, each of the plurality of random access configurations indicating different random access parameters for different random access message configurations in the specific type of random access procedure;
   selecting a random access configuration of the plurality of random access configurations;
   generating a first random access message having a preamble and a payload, based on the selected random access configuration; and
   transmitting, to the network entity, the first random access message to initiate the specific type of random access procedure.

2. The method of claim 1, further comprising:
   determining at least one of a reference signal (RS) signal to noise ratio (SNR), a RS signal to interference noise ratio (SINR), a reference signal received power (RSRP), or a reference signal received quality (RSRQ); and
   selecting one of the plurality of random access configurations based on the determining.

3. The method of claim 1, wherein the plurality of random access configurations comprises parameters for transmission of the first random access message, the parameters including at least one of a preamble numerology, a preamble format, a cyclic shift for a preamble sequence, an initial transmit power for the preamble, or a power control step size.

4. The method of claim 1, wherein the plurality of random access configurations comprises parameters for transmission of the first random access message, the parameters including at least one of a physical uplink shared channel (PUSCH) resource unit, a PUSCH waveform, a PUSCH initial transmit power, a frequency hopping pattern, a repetition factor, a modulation coding scheme, or a power control step size.

5. The method of claim 1, wherein the preamble and the payload of the first random access message are transmitted on a same transmission beam.

6. The method of claim 1, wherein at least one of the plurality of random access configurations comprises contention-based parameters for transmitting the first random access message in a contention based random access procedure, wherein the contention-based parameters include at least one of a physical random access channel (PRACH) repetition, a physical uplink shared channel (PUSCH) repetition, power boosting for PRACH or PUSCH, or a power control step size, wherein the first random access message is transmitted on resources allocated for a set of UEs for a contention-based random access procedure.

7. The method of claim 1, wherein at least one of the plurality of random access configurations comprises contention-free parameters for transmitting the first random access message in a contention free random access procedure, wherein the contention-free parameters include at least one of a physical random access channel (PRACH) repetition, a physical uplink shared channel (PUSCH) repetition, power boosting for PRACH or PUSCH, or a power control step size, wherein the first random access message is transmitted on resources allocated specifically for the UE for a contention-free random access procedure.

8. The method of claim 1, wherein the first random access message is transmitted at a first frequency, further comprising:
   receiving, from the network entity, a second random access message at a second frequency that is within a threshold frequency difference from the first frequency, wherein the receiving the second random access message comprises:
     receiving a physical downlink control channel (PDCCH) of the second random access message based on a subset of PDCCH aggregation levels (ALs) in response to the first random access message, and
     receiving a physical downlink shared channel (PDSCH) of the second random access message in response to the first random access message; and
   determining whether to retune between the transmitting of the first random access message and the receiving of the second random access message based on the threshold frequency difference and a frequency relation between the first frequency and the second frequency.

9. The method of claim 8, wherein the subset of the PDCCH ALs includes at least one of AL8 or AL16.

10. The method of claim 8, further comprising:
    determining a PDSCH repetition configuration, wherein the PDSCH is received based on the PDSCH repetition configuration.

11. The method of claim 8, further comprising determining that a frequency difference between a first frequency at which the first random access message is transmitted and a second frequency at which the second random access message is received is lesser than a threshold frequency difference.

12. The method of claim 11, where the threshold frequency difference is zero, wherein the first frequency at which the first random access message is transmitted is equivalent to the second frequency at which the second random access message is received.

13. An apparatus for wireless communication, comprising:
    a memory; and
    at least one processor coupled to the memory and configured to:
      receive, from a network entity, random access configuration information, comprising a plurality of random access configurations associated with a specific type of random access procedure, each of the plurality of random access configurations indicating different random access parameters for different random access message configurations in the specific type of random access procedure;
      select a random access configuration of the plurality of random access configurations;
      generate a first random access message having a preamble and a payload, based on the selected random access configuration; and transmit, to the network entity, the first random access message to initiate the specific type of random access procedure.

14. The apparatus of claim 13, wherein the at least one processor is further configure configured to:
determine at least one of a reference signal (RS) signal to noise ratio (SNR), a RS signal to interference noise ratio (SINR), a reference signal received power (RSRP), or a reference signal received quality (RSRQ); and
select one of the plurality of random access configurations based on the determination.

15. The apparatus of claim 13, wherein the plurality of random access configurations comprises parameters for transmission of the first random access message, the parameters including at least one of a preamble numerology, a preamble format, a cyclic shift for a preamble sequence, an initial transmit power for the preamble, or a power control step size.

16. The apparatus of claim 13, wherein the plurality of random access configurations comprises parameters for transmission of the first random access message, the parameters including at least one of a physical uplink shared channel (PUSCH) resource unit, a PUSCH waveform, a PUSCH initial transmit power, a frequency hopping pattern, a repetition factor, a modulation coding scheme, or a power control step size.

17. The apparatus of claim 13, wherein the preamble and the payload of the first random access message are transmitted on a same transmission beam.

18. The apparatus of claim 13, wherein at least one of the plurality of random access configurations comprises contention-based parameters for transmitting the first random access message in a contention-based random access procedure, wherein the contention-based parameters include at least one of a physical random access channel (PRACH) repetition, a physical uplink shared channel (PUSCH) repetition, power boosting for PRACH or PUSCH, or a power control step size, wherein the first random access message is transmitted on resources allocated for a set of UEs for the contention-based random access procedure.

19. The apparatus of claim 13, wherein at least one of the plurality of random access configurations comprises contention-free parameters for transmitting the first random access message in a contention-free random access procedure, wherein the contention-free parameters include at least one of a physical random access channel (PRACH) repetition, a physical uplink shared channel (PUSCH) repetition, power boosting for PRACH or PUSCH, or a power control step size, wherein the first random access message is transmitted on resources allocated specifically for a user equipment for the contention-free random access procedure.

20. The apparatus of claim 13, wherein the first random access message is transmitted at a first frequency, wherein the at least one processor is further configure configured to:
receive, from the network entity, a second random access message at a second frequency that is within a threshold frequency difference from the first frequency, wherein the at least one processor configured to receive the second random access message is further configured to:
receive using blind detection a physical downlink control channel (PDCCH) of the second random access message based on a subset of PDCCH aggregation levels (ALs) in response to the first random access message, and
receive a physical downlink shared channel (PDSCH) of the second random access message in response to the first random access message.

21. The apparatus of claim 20, wherein the subset of the PDCCH ALs includes at least one of AL8 or AL16.

22. The apparatus of claim 20, wherein the at least one processor is further configured to determine a PDSCH repetition configuration, wherein the PDSCH is received based on the PDSCH repetition configuration.

23. The apparatus of claim 20, wherein the at least one processor is further configured to determine a frequency difference between a first frequency at which the first random access message is transmitted and a second frequency at which the second random access message is received is lesser than a threshold frequency difference.

24. The apparatus of claim 23, where the threshold frequency difference is zero, wherein the first frequency at which first random access message is transmitted is equivalent to the second frequency at which the second random access message is received.

25. A method of wireless communication at a network entity, the method comprising:
transmitting, to a user equipment (UE), random access configuration information for a random access procedure, wherein the random access configuration information comprises a plurality of random access configurations associated with a specific type of random access procedure, each of the plurality of random access configurations indicating different random access parameters for different random access message configurations in the specific type of random access procedure;
receiving, from the UE, a first random access message to initiate the specific type of random access procedure, the first random access message comprising a preamble and a payload, wherein configuration of the preamble and the payload is based on one of the plurality of random access configurations;
processing the first random access message;
generating a second random access message in response to the first random access message; and
transmitting, to the UE, the second random access message.

26. The method of claim 25, wherein the plurality of random access configurations comprises parameters for transmission of the first random access message, the parameters including at least one of a preamble numerology, a preamble format, a cyclic shift for a preamble sequence, an initial transmit power for the preamble, or a power control step size.

27. The method of claim 25, wherein the plurality of random access configurations comprises at least one of a physical uplink shared channel (PUSCH) resource unit, a PUSCH waveform, a PUSCH initial transmit power, a frequency hopping pattern, a repetition factor, a modulation coding scheme, or a power control step size.

28. The method of claim 25, wherein the preamble and the payload of the first random access message are received on a same reception beam.

29. The method of claim 25, wherein at least one of the plurality of random access configurations comprises contention-based parameters for transmitting the first random access message in a contention-based random access procedure, wherein the contention-based parameters include at least one of a physical random access channel (PRACH) repetition, a physical uplink shared channel (PUSCH) repetition, power boosting for PRACH or PUSCH, a power control step size, wherein the first random access message is transmitted on resources allocated for a set of UEs for the contention-based random access procedure.

30. An apparatus for wireless communication, comprising:
- a memory; and
- at least one processor coupled to the memory and configured to:
  - transmit, to a user equipment (UE), random access configuration information for a random access procedure, wherein the random access configuration information comprises a plurality of random access configurations associated with a specific type of random access procedure, each of the plurality of random access configurations indicating different random access parameters for different random access message configurations in the specific type of random access procedure;
  - receive, from the UE, a first random access message to initiate the specific type of random access procedure, the first random access message comprising a preamble and a payload, wherein configuration of the preamble and the payload is based on one of the plurality of random access configurations;
  - process the first random access message;
  - generate a second random access message in response to the first random access message; and
  - transmit, to the UE, the second random access message.

* * * * *